(12) United States Patent
Kitajima

(10) Patent No.: US 7,775,471 B2
(45) Date of Patent: Aug. 17, 2010

(54) SPOOL OF FISHING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/337,625

(22) Filed: Dec. 18, 2008

(65) Prior Publication Data
US 2009/0166460 A1 Jul. 2, 2009

(30) Foreign Application Priority Data
Dec. 27, 2007 (JP) .............................. 2007-335901

(51) Int. Cl.
*A01K 89/01* (2006.01)
(52) U.S. Cl. .................... 242/322; 242/614.1
(58) Field of Classification Search ................ 242/322, 242/614, 614.1
See application file for complete search history.

(56) References Cited

U.S. PATENT DOCUMENTS

| | | | |
|---|---|---|---|
| 3,870,245 A | | 3/1975 | Witteborg, Jr. |
| 5,755,398 A | * | 5/1998 | Thompson et al. ........... 242/614 |
| 5,833,160 A | * | 11/1998 | Enomoto et al. ............. 242/348 |
| 5,887,811 A | | 3/1999 | Tsutumi |
| 6,959,892 B2 | * | 11/2005 | Sanda ..................... 242/608.8 |
| 7,097,124 B2 | * | 8/2006 | Ikuta et al. ................. 242/322 |
| 7,384,012 B2 | * | 6/2008 | Burk .......................... 242/322 |

FOREIGN PATENT DOCUMENTS

| | | |
|---|---|---|
| EP | 1 767 088 A1 | 3/2007 |
| JP | S52-101786 U | 8/1977 |
| JP | S58-011170 Y | 3/1983 |
| JP | 2004-290017 A | 10/2004 |

OTHER PUBLICATIONS

The extended European Search Report in corresponding European Application No. 08173026.9, dated Apr. 20, 2010.

* cited by examiner

*Primary Examiner*—Emmanuel M Marcelo
(74) *Attorney, Agent, or Firm*—Global IP Counselors, LLP

(57) ABSTRACT

An indicating section is formed in a rear flange portion of a metal spool. The indicating section includes first and second stepped portions. These portions are indicators for the amount of fishing line wound around spool. The first stepped portion is formed by first and second surfaces. The first surface is part of the surface of the rear flange portion. The second surface is formed radially outward of the first surface. The axial heights of the first and second surfaces are different from each other. The second stepped portion is formed by third and fourth surfaces and is also formed radially outward of the first stepped portion. The third surface is part of the surface of the rear flange portion. The fourth surface is formed radially outward of the third surface. The axial heights of the third and fourth surfaces are different from each other.

14 Claims, 12 Drawing Sheets

US 7,775,471 B2

SPOOL OF FISHING REEL

CROSS-REFERENCE TO RELATED APPLICATIONS

This application claims priority under 35 U.S.C. §119 to Japanese Patent Application No. 2007-335901, filed on Dec. 27, 2007. The entire disclosure of Japanese Patent Application No. 2007-335901 is hereby incorporated herein by reference.

BACKGROUND OF THE INVENTION

1. Field of the Invention

Aspects of the present invention generally relates to a spool, and more specifically, the present invention relates to a spool of a fishing reel for winding and releasing a fishing line.

2. Background Information

A fishing reel is mounted to a fishing rod for winding and releasing a fishing line. The fishing reel is generally classified as a spinning reel and a dual-bearing reel. A fishing reel of this type includes a reel unit and a spool. The reel unit is mounted to the fishing rod, and the spool is mounted to the reel unit for winding the fishing line.

The spool of the dual-bearing reel is supported by the reel unit and is capable of rotating. On the other hand, the spool of the spinning reel is mounted to the reel unit and is capable of moving back and forth.

The spool of the dual-bearing reel includes a bobbin trunk and flange portions. The bobbin trunk is formed in a tubular shape, and the fishing line is wound around the bobbin trunk. The flanges have a disk shape and are mounted to both ends of the bobbin trunk. The flanges protrude radially outward from both ends of the bobbin trunk.

On the other hand, the spool of the spinning reel includes a bobbin trunk, a front flange, a rear flange, and a skirt portion. The bobbin trunk has a tubular shape, and the fishing line is wound around the outer peripheral surface of the bobbin trunk. The front flange portion is mounted to the front end of the bobbin trunk and protrudes radially outward from the front end. The rear flange portion is mounted to the rear end of the bobbin trunk and protrudes radially outward from the rear end. The skirt portion has a cylindrical shape and is mounted to the rear flange portion. The skirt portion protrudes rearward from the rear flange portion. The above-mentioned elements making up the spool of the fishing reel are formed as an integral unit and are made of metal (e.g., aluminum alloy and magnesium alloy). Furthermore, the anodized treatment (e.g., alumite treatment) is performed on the surface of the spool to enhance its corrosion resistance.

Japanese Examined Utility Model Application Publication No. JP-Y-S58-011170 and Japanese Unexamined Utility Model Application Publication No. JP-U-S52-101786 disclose spools of a fishing reel of the above-mentioned type. Specifically, a plurality of circular indicating sections is formed on the fishing-line winding surface of the flange portion of the dual-bearing reel (or on the fishing-line winding surface of the front flange portion of the spinning reel). Diameters of the circular indicating sections are different from each other. In general, a predetermined kind of fishing line is wound around the bobbin trunk for regulating the amount of fishing line actually used. The circular indicating sections function as indicators for the amount of the fishing line wound around the bobbin trunk. In the examples of the above-mentioned publications, an angler is easily capable of ascertaining the amount of the fishing line (e.g., 50 or 100 meter, 0.260 mm dia.) that can be wound around the spool depending on the position of the circular indicators. For example, the circular indicators are a plurality of V-shaped grooves and are produced by cutting the metal surface of the flange portion of the dual-bearing reel or the metal surface of the front flange portion of the spinning reel. As described above, in a fishing reel having a conventional spool, the plurality of circular indicators function as an indicator for the amount of fishing line wound around the bobbin trunk. The plurality of circular indicators is produced in the form of the plurality of V-shaped grooves by cutting the metal surface of the flange portion of the dual-bearing reel or that of the front flange portion of the spinning reel. In general, the anodized treatment (e.g., alumite treatment) is often performed on the spool after the indicators are produced, i.e., in the form of the plurality of V-shaped grooves. However, widths of the plurality of V-shaped grooves are narrow. Therefore, layers (e.g., an anodized layer and a coating layer) are not optimally formed on bottom portions or edge portions of the grooves. If the layers are not optimally formed on these portions, metal (e.g., aluminum alloy) portions of the spool are exposed to the atmosphere and to other metal parts of the fishing reel as well. As a result, corrosion resistance of the metal spool may be impaired.

In view of the above, it will be apparent to those skilled in the art from this disclosure that there exists a need for an improved metal spool of a fishing reel for preventing corrosion resistance. This invention addresses this need in the art as well as other needs, which will become apparent to those skilled in the art from this disclosure.

SUMMARY OF THE INVENTION

Accordingly, aspects of the present invention have been created to solve the above-mentioned problems occurring in the conventional practice, and to provide a fishing reel with a metal spool whereby the corrosion resistance of the metal spool is not easily weakened.

According to one aspect of the present invention, a spool of a fishing reel is configured to wind and release a fishing line. The spool of the fishing reel includes a bobbin trunk, a first flange portion, a second flange portion, and an indicating section. The bobbin trunk is a tubular member for winding the fishing line on its outer periphery. The first and second flange portions are metal members. The first and second flange portions protrude radially outward from both ends of the bobbin trunk. The first and second flange portions are opposed to each other. The indicating section includes first and second stepped portions. The first stepped portion functions as an indicator for the amount of the fishing line to be wound around the bobbin trunk. The first stepped portion is formed by first and second surfaces. The first surface is formed on at least one of the opposed surfaces of the first and second flange portions. The second surface is formed radially outside of the first surface. The axial heights of the first and second surfaces are different from each other. The second stepped portion functions as an indicator for the amount of the fishing line to be wound. The second stepped portion is formed by third and fourth surfaces. The second stepped portion is formed radially outside the first stepped portion. The third surface is formed on at least one of the opposed surfaces of the first and second flange portions. The fourth surface is formed radially outside of the third surface. The axial heights of the third and fourth surfaces are different from each other.

According to the spool, the metal first flange portion and/or the metal second flange portion include(s) the indicating section including the first and second stepped portions, and the first and second stepped portions function as the indicators for the amount of the fishing line to be wound. In addition, the first stepped portion is formed by the first and second surfaces with different axial heights. The second stepped portion is formed by the third and fourth surfaces with different axial heights. The second stepped portion is arranged radially outside the first stepped portion. For example, the first stepped portion is an annular stepped portion. The first stepped portion is formed on a part of the first flange portion and/or the second flange portion. The first stepped portion is arranged proximally to and radially outside the bobbin trunk. Specifically, the first stepped portion is formed on the small-diameter side of the first flange portion and/or the second flange portion. When the 50 meter, 0.260 mm dia. fishing line is wound around the spool, the wound fishing line will be positioned in the first stepped portion. On the other hand, the second stepped portion is arranged radially outside the first stepped portion. The second stepped portion is an annular stepped portion. The second stepped portion is formed on a part of the first flange portion and/or the second flange portion. The second stepped portion is arranged away from and radially outside the bobbin trunk. Specifically, the second stepped portion is formed on the large-diameter side of the first flange portion and/or the second flange portion. When the 100 meter, 0.260 mm dia. fishing line is wound around the spool, the wound fishing line will be positioned in the second stepped portion. If the spool is capable of totally winding the 150 meter, 0.260 mm dia. fishing line around its bobbin trunk and the first stepped portion or the second stepped portion is used as the indicator for the amount of the fishing line to be wound, it is possible to easily wind the 0.260 mm dia. fishing line of a predetermined length (e.g., 50 or 100 meter) around the spool. Here, the indicating section is formed by the first and second stepped portions with different axial heights, and the first and second stepped portions function as the indicators for the amount of the fishing line to be wound. Therefore, it is not necessary to form a plurality of V-shaped grooves in the spool of the present invention while the V-shaped grooves have been formed in the conventional spool. Accordingly, even if the anodized treatment (e.g., the alumite treatment) is preformed after the first and second stepped portions are formed, it is possible to entirely cover the first and second stepped portions with alumite or an anodized layer. On the other hand, it is quite difficult to entirely cover the V-shaped grooves with it. Therefore, corrosion resistance of the metal spool will not be easily impaired.

Another aspect of the present invention relates to the spool wherein the first, second, third, and fourth surfaces are formed on either of the first and second flange portions. In addition, the second and third surfaces are smoothly connected to each other and have the same axial height. In this case, the axial heights of the second and third surfaces are the same. For example, when the axial heights of the second and third surfaces are the same and a recess is dented in a radially outward direction (i.e., a direction opposite from a direction that the first and second flange portions face to each other), two stepped portions are simultaneously formed on the radial ends of the recess. Also, when the axial heights of the second and third surfaces are the same and a protrusion is protruded in a radially inward direction (i.e., a direction that the first and second flange portions face to each other), two stepped portions are simultaneously formed on the radial ends of the protrusion. Thus, it is possible to simplify the working process of the first and second stepped portions.

According to another aspect of the present invention, the second surface is recessed and the axial height of the second surface is lower than that of the first surface, or the fourth surface is dented and the axial height of the fourth surface is lower than that of the third surface. In this case, the second surface is a dented step with the axial height lower than that of the first surface, or the fourth surface is a dented step with the axial height lower than that of the third surface. Therefore, even if a part of the fishing line radially wound inside the stepped portion is released, the stepped portion does not block releasing of the fishing line.

According to yet another aspect of the present invention, the second surface is protruded and the axial height of the second surface is height higher than that of the first surface, or the fourth surface is protruded and the axial height of the fourth surface is higher than that of the third surface. In this case, the second surface is a protruded step with the axial height higher than that of the first surface, or the fourth surface is a protruded step with the axial height higher than that of the third surface. Therefore, it possible to easily view and confirm the positions of the first and second stepped portions.

According to still another aspect of the present invention, at least one of the first and second stepped portions is tapered. In this case, it is possible to prevent the fishing line from getting stuck with the first stepped portion and/or the second stepped portion by forming at least one of the first and second stepped portions in a tapered shape. Furthermore, the edge portion(s) of the first stepped portion and/or the second stepped portion are/is not acute-angled. Thus it will be easy to form a layer (e.g., an anodized layer and a coating layer) on them/it.

According to another aspect of the present invention, the first surface, the first stepped portion, and the second surface are smoothly connected to each other, or the third surface, the second stepped portion, and the fourth surface are smoothly connected to each other. In this case, it is possible to prevent the fishing line from getting stuck with the connected portions by smoothly connecting the first surface, the first stepped portion, and the second surface, or smoothly connecting the third surface, the second stepped portion, and the fourth surface.

According to another aspect of the present invention, the bobbin trunk, the first flange portion, and the second flange portion are made of metal and are integrally formed. In this case, it is possible to highly maintain strength of the spool by integrally forming the bobbin trunk, the first flange portion, and the second flange portion with metal (e.g., aluminum alloy and magnesium alloy).

According to yet another aspect of the present invention, an anodized layer is formed on the metal surfaces of the first and second flange portions, respectively, by an anodized treatment. In general, metal such as aluminum alloy or magnesium alloy is easily corroded by the anodized treatment. However, according to the eighth aspect, alumite or an anodized layer is formed on the surface of the spool made of such metal. Therefore, it is possible to further enhance corrosion resistance of the metal spool.

According to still another aspect of the present invention, the fishing reel is a spinning reel configured to release the fishing line forward, and the spool is movably mounted along the longitudinal axis of a reel unit. In addition, the first flange portion corresponds to a front flange portion protruding radially outward from the front end of the bobbin trunk. Also, the second flange portion corresponds to a rear flange portion radially protruding outward from the rear end of the bobbin trunk. In this case, corrosion resistance of the metal spool will not be easily impaired by forming a indicating section including the first and second stepped portions in the front flange portion and/or the rear flange portion of the spinning reel.

According to another aspect of the present invention, the fishing reel is a dual-bearing reel for winding and releasing the fishing line, and the spool is rotatably mounted to a reel unit. In addition, the first and second flange portions are disk flange portions radially protruding outward from the both ends of the bobbin trunk, respectively. In this case, corrosion resistance of the metal spool will not be easily impaired by forming a indicating section including the first and second stepped portions in the flange portion of the dual-bearing reel.

As described above, according to aspects of the present invention, the metal first flange portion and/or the metal second flange portion of the spool of a fishing reel include(s) the indicating section including the first and second stepped portions functioning as indicators for the amount of fishing line to be wound. The first stepped portion is formed by the first and second surfaces, and the axial heights of the first and second surfaces are different from each other. The second stepped portion is formed by the third and fourth surfaces, and the axial heights of the third and fourth surfaces are different from each other. Also, the second stepped potion is arranged radially outside the first stepped portion. Therefore, corrosion resistance of the metal spool will not be easily impaired.

These features, aspects and advantages of the present invention will become apparent to those skilled in the art from the following detailed description, which, taken in conjunction with the annexed drawings, disclose embodiments of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
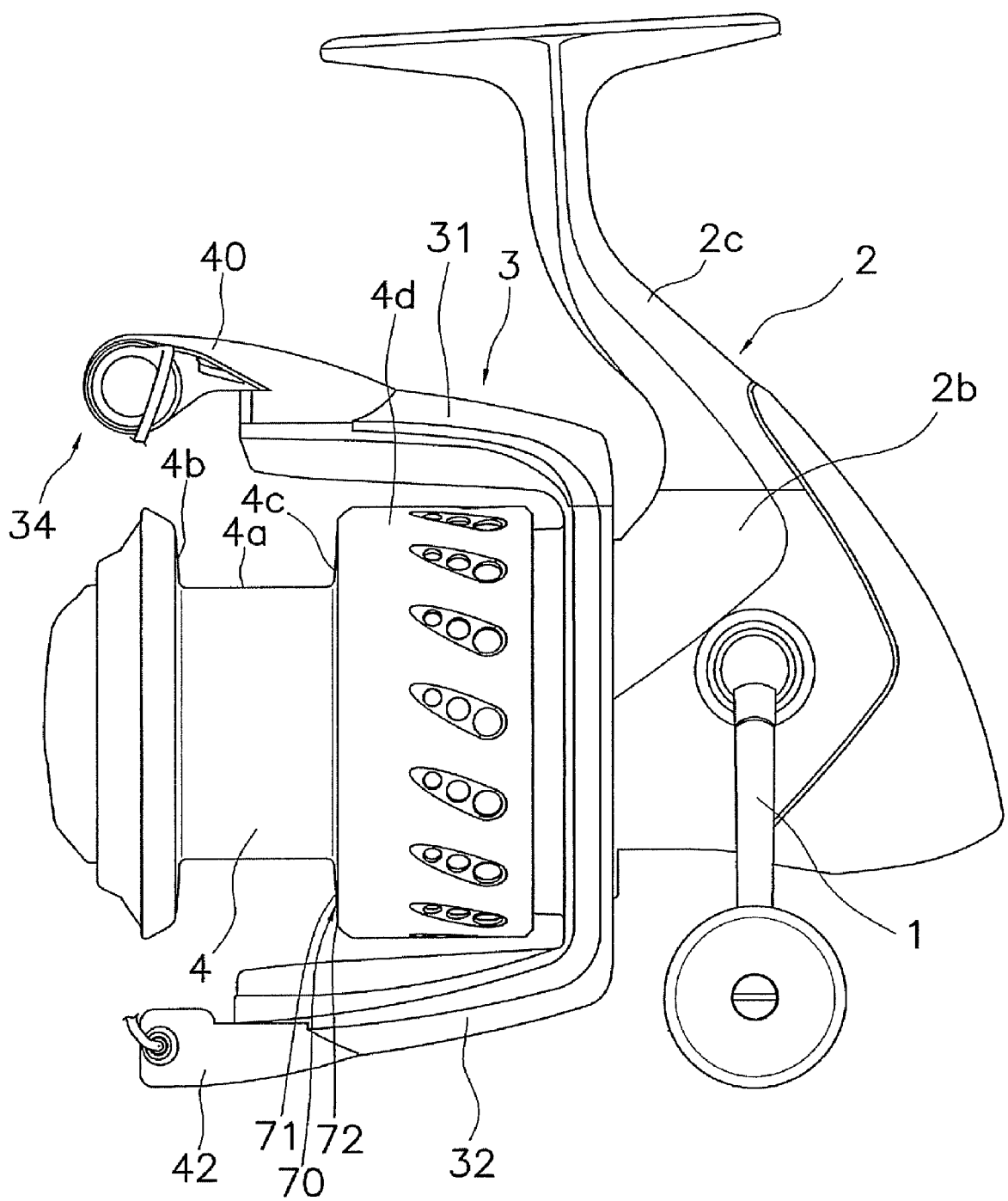
FIG. 1 is a lateral side view of a spinning reel that an embodiment of the present invention is applied.
Figure 2:
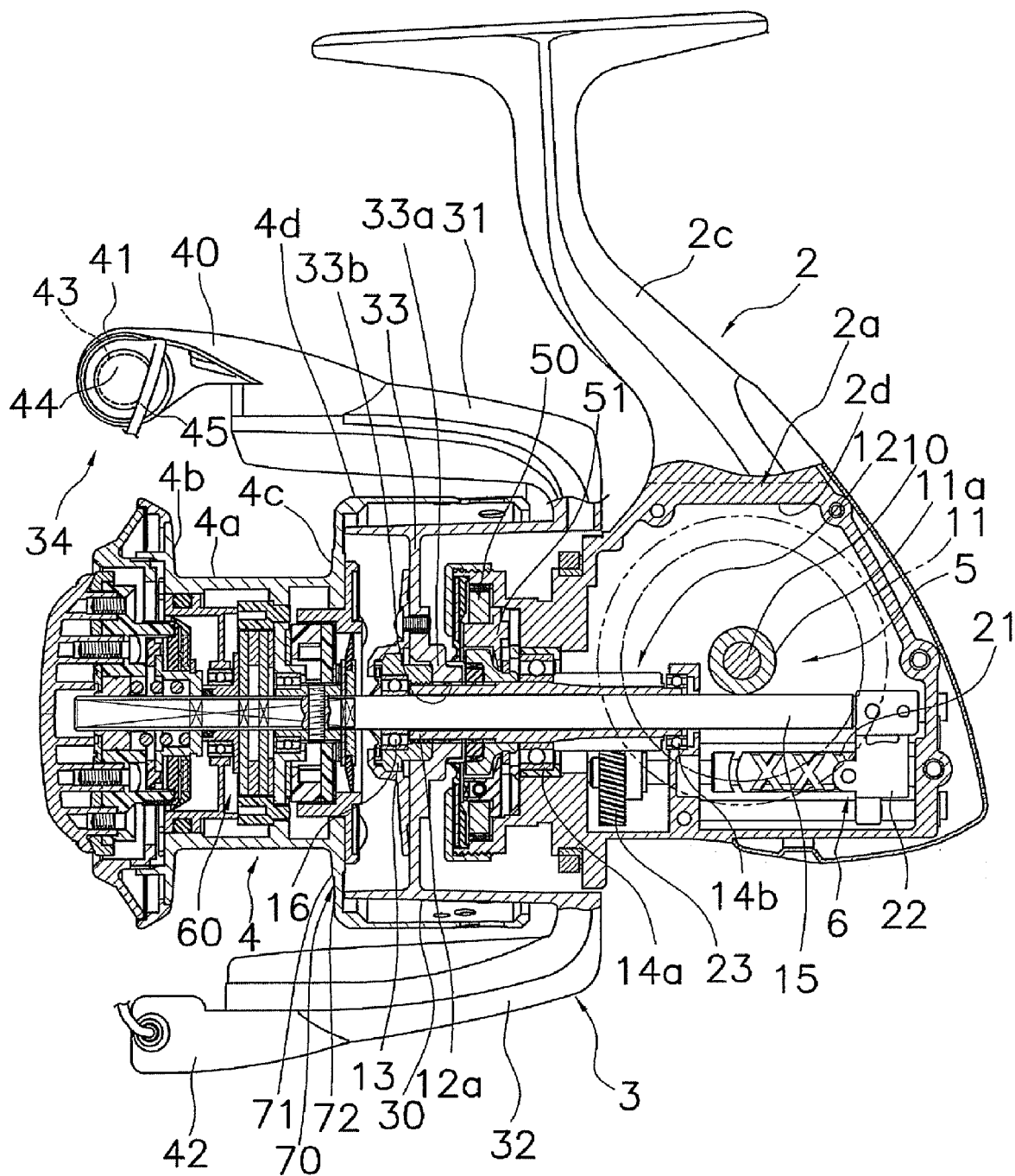
FIG. 2 is a lateral side cross-sectional view of the spinning reel.

Referring initially to FIGS. 1 and 2, a spinning reel in accordance with an embodiment of the present invention includes a handle assembly 1, a reel unit 2, a rotor 3, and a spool 4. The reel unit 2 rotatably supports the handle assembly 1. The rotor 3 is rotatably supported in front of the reel body 2 and winds a fishing line around the spool 4. The spool 4 is arranged in front of the rotor 3 and is capable of moving back and forth. The fishing line is wound around the outer surface of the spool 4. Note that it is possible to attach the handle assembly 1 to either the left side (see FIG. 1) or the right side of the reel unit 2.

As illustrated in FIGS. 1 and 2, the reel unit 2 includes a reel body 2a, a lid member 2b, a rod attachment leg 2c, and an opening 2d. The reel body 2a and the lid member 2b are made of, for example, aluminum alloy. The lid member 2b is detachably mounted to the reel body 2a and covers the opening 2d. The rod attachment leg 2c is extended obliquely forward and upward from the reel body 2a. The reel body 2a includes a space in its interior. The space accommodates a rotor driving mechanism 5 and an oscillating mechanism 6. The rotor driving mechanism 5 rotates the rotor 3 in conjunction with rotation of the handle assembly 1. The oscillating mechanism 6 moves the spool 4 back and forth to uniformly wind the fishing line around the spool.

As illustrated in FIG. 2, the rotor driving mechanism 5 includes a main gear 11 and a pinion gear 12. The main gear 11 rotates with a main gear shaft 11a. A handle shaft 10 of the handle assembly 1 is fixed to the main gear shaft 11a. The pinion gear 12 meshes with the main gear 11. The pinion gear 12 has a tubular shape. A front portion 12a of the pinion gear 12 penetrates the center part of the rotor 3 and is fixed to the rotor 3 with a nut 13. The axial intermediate portion and the axial rear end portion of the pinion gear 12 are supported in the reel body 2a through bearings 14a and 14b and are capable of rotating. The bearings 14a and 14b are mounted to the reel body 2a and are separated from each other.

A spool shaft 15 is coupled to the center part of the spool 4 through a drag mechanism 60. The oscillating mechanism 6 moves the spool shaft 15 back and forth for moving the spool 4 in the same direction. The oscillating mechanism 6 includes a spiral shaft 21, a slider 22, and an intermediate gear 23. The spiral shaft 21 is arranged below and is parallel to the spool shaft 15. The slider 22 moves back and forth along the spiral shaft 21. The intermediate gear 23 is fixed to the tip of the spiral shaft 21. The rear end of the spool shaft 15 is fixed to the slider 22 and is not capable of rotating. The intermediate gear 23 meshes with the pinion gear 12.

The spool shaft 15 penetrates the center part of the pinion gear 12. The oscillating mechanism 6 reciprocates the spool shaft 15 back and forth in the interior of the pinion gear 12. The intermediate portion of the spool shaft 15 is supported by a bearing 16 mounted to the inner side of the nut 13. The rear portion of the spool shaft 15 is supported by the inner peripheral surface of the rear portion of the pinion gear 12. Thus, the spool shaft 15 is capable of rotating and axially moving.

As illustrated in FIG. 2, the rotor 3 includes a cylindrical part 30, a first rotor arm 31, and a second rotor arm 32. The first and second rotor arms 31 and 32 are arranged lateral to the cylindrical part 30, and are opposed to each other. For example, the cylindrical part 30 and the first and second rotor arms 31 and 32 are made of aluminum alloy, and are integrally formed.

A front wall 33 is formed in the front portion of the cylindrical part 30. As shown in FIG. 2, a boss portion 33a is formed in the center part of the front wall 33. A through hole 33b is formed in the center part of the boss portion 33a. The front portion 12a of the pinion gear 12 and the spool shaft 15 penetrate the through hole 33b. The nut 13 is arranged in front of the front wall 33.

The first rotor arm 31 is extended forward from the cylindrical part 30 and has a convex shape. The first rotor arm 31 is also expanded and curved in a circumferential direction of the cylindrical part 30. The second rotor arm 32 is extended forward from the cylindrical part 30 and has a convex shape. Its coupling portion to the cylindrical part 30 is expanded and curved in the circumferential direction of the cylindrical part 30. Note that the second rotor arm 32 has an opening (not illustrated in the figure) for reducing its weight.

The bail arm 34 is mounted to the tips of the first and second rotor arms 31 and 32. The bail arm 34 is capable of pivoting between the line releasing position and the line winding position. The bail arm 34 is biased by means of a bail flipping mechanism (not illustrated in the figure) and is accordingly set to be either the line releasing position or the line winding position.

As illustrated in FIG. 2, the bail arm 34 includes a first bail support member 40, a second bail support member 42, a line roller 41, a fixing shaft 43, a fixing shaft cover 44, and bail 45. The first bail support member 40 is mounted to the outer peripheral side of the tip of the first rotor arm 31 and is capable of pivoting. The second bail support member 42 is mounted to the outer peripheral side of the tip of the second rotor arm 32 and is capable of pivoting. The line roller 41 is mounted to the tip of the first bail support member 40. The fixing shaft 43 is fixed to the tip of the first bail support member 40, and only one end of the fixing shaft 43 is supported by the first bail support member 40. The fixing shaft cover 44 is arranged on the tip side of the fixing shaft 43. The bail 45 couples the fixing shaft cover 44 and the second bail support member 42.

As illustrated in FIG. 2, an anti-reverse rotation mechanism 50 is arranged in the interior of the coupling part (i.e., cylindrical part 30) of the rotor 3 for prohibiting reverse rotation of the rotor 3. The anti-reverse rotation mechanism 50 includes a roller type one-way clutch 51. Here, an inner ring of the one-way clutch 51 idles. The anti-reverse rotation mechanism 50 constantly prevents the rotor 3 from rotating from the line releasing direction to the line winding direction (i.e., prevents reverse rotation of the rotor 3). The anti-reverse rotation mechanism 50 never allows reverse rotation of the rotor 3.

As illustrated in FIGS. 1 and 2, the spool 4 is arranged between the first and second rotor arms 31 and 32 of the rotor 3. The spool is mounted to the tip of the spool shaft 15. As illustrated in an enlarged view of FIG. 3, the spool 4 is composed of integral parts and includes a bobbin trunk 4a, a front flange portion 4b, a rear flange portion 4c, and a skirt portion 4d. The front flange portion 4b is formed integral with the front end of the bobbin trunk 4a. The rear flange portion 4c is formed integral with the rear end of the bobbin trunk 4a. The skirt portion 4d is formed integral with the tip of the rear flange portion 4c. The skirt portion 4d extends rearward. The fishing line is wound around the outer periphery surface of the bobbin trunk 4a. The bobbin trunk 4a, the front flange portion 4b, the rear flange portion 4c, and the skirt portion 4d are made of, e.g., aluminum alloy, and alumite is formed on the surface of these members by an alumite treatment (an example of the anodized treatment). Here, after-mentioned first and second step portions 71 and 72 are formed, and then the anodized treatment (e.g., alumite treatment) will be performed.

The bobbin trunk 4a is a cylindrical member. The outer peripheral surface of the bobbin trunk 4a is arranged parallel to the spool shaft 15. The skirt portion 4d is formed in a tubular shape and extends rearward from the tip of the rear flange portion 4c. The coupling part 30 of the rotor 3 is arranged on the inner side of the skirt portion 4d.

Figure 3:
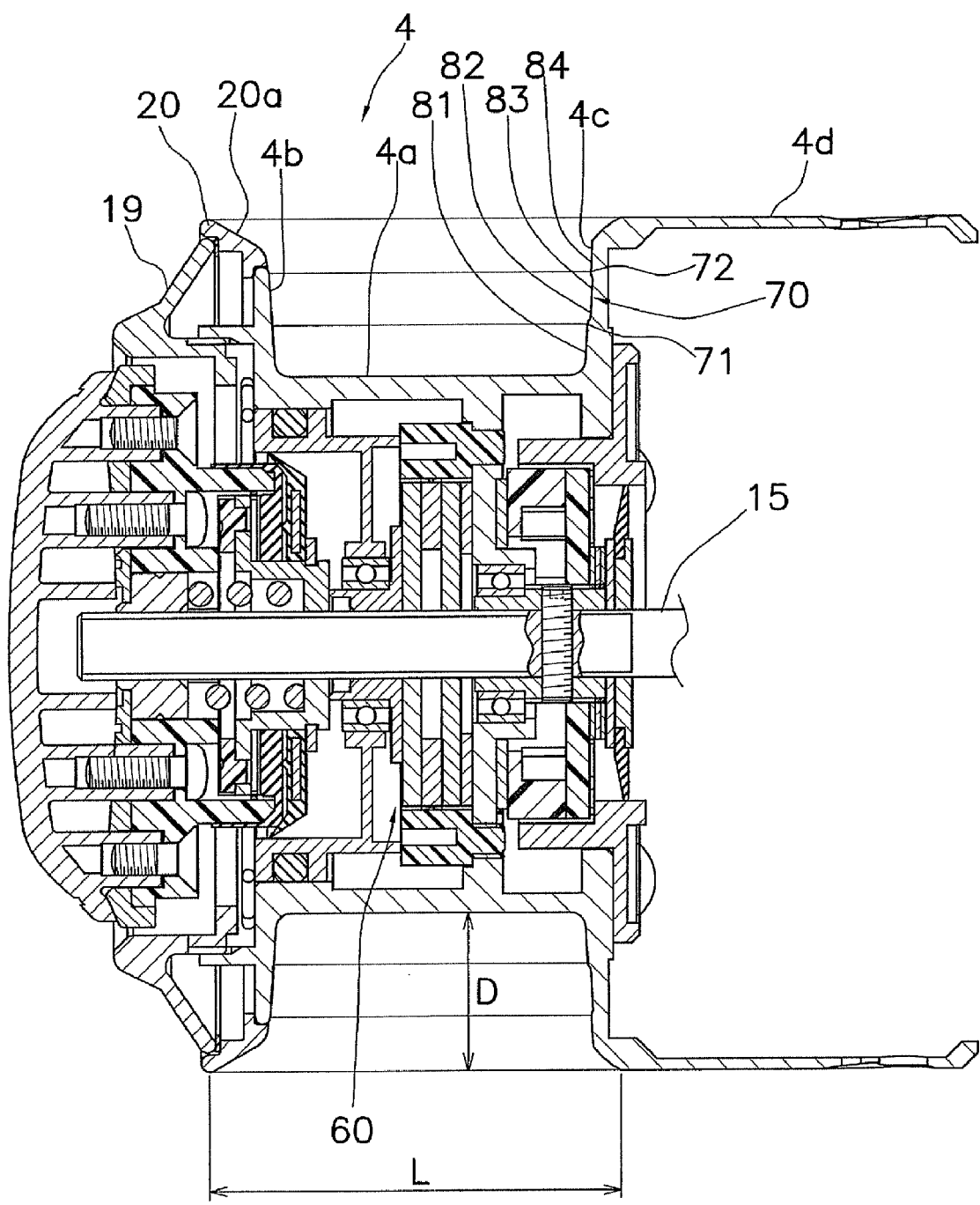
FIG. 3 is an enlarged lateral side cross-sectional view of a spool of the spinning reel.

As illustrated in FIG. 3, a spool ring 20 is mounted to the outer peripheral surface of the front flange portion 4b. The spool ring 20 is made of metal, thereby smoothly releasing the fishing line from the bobbin trunk 4a. The spool ring 20 includes a sloped surface 20a that extends toward the outer peripheral edge portion of the spool ring 20. The spool ring 20 is fixed to the front flange portion 4b by a spool ring fixing member 19. Also, when the maximum amount of fishing line is wound around the bobbin trunk 4a, the thickness of the fishing line wound around the bobbin trunk 4a corresponds to a distance D from the outer surface of the spool 4 to a theoretical line L connecting the spool ring 20 and the outer peripheral surface of the skirt portion 4d along an axial direction of the bobbin trunk 4a (see FIG. 3). For example, the radial height from the outer surface of the spool 4 to the theoretical line L is configured for allowing, e.g., a 150 meter, 0.260 mm dia. fishing line to be wound around the spool 4. The radial height is the distance in the radial direction with the peripheral surface of the bobbin trunk 4a as a reference point.

Figure 4:
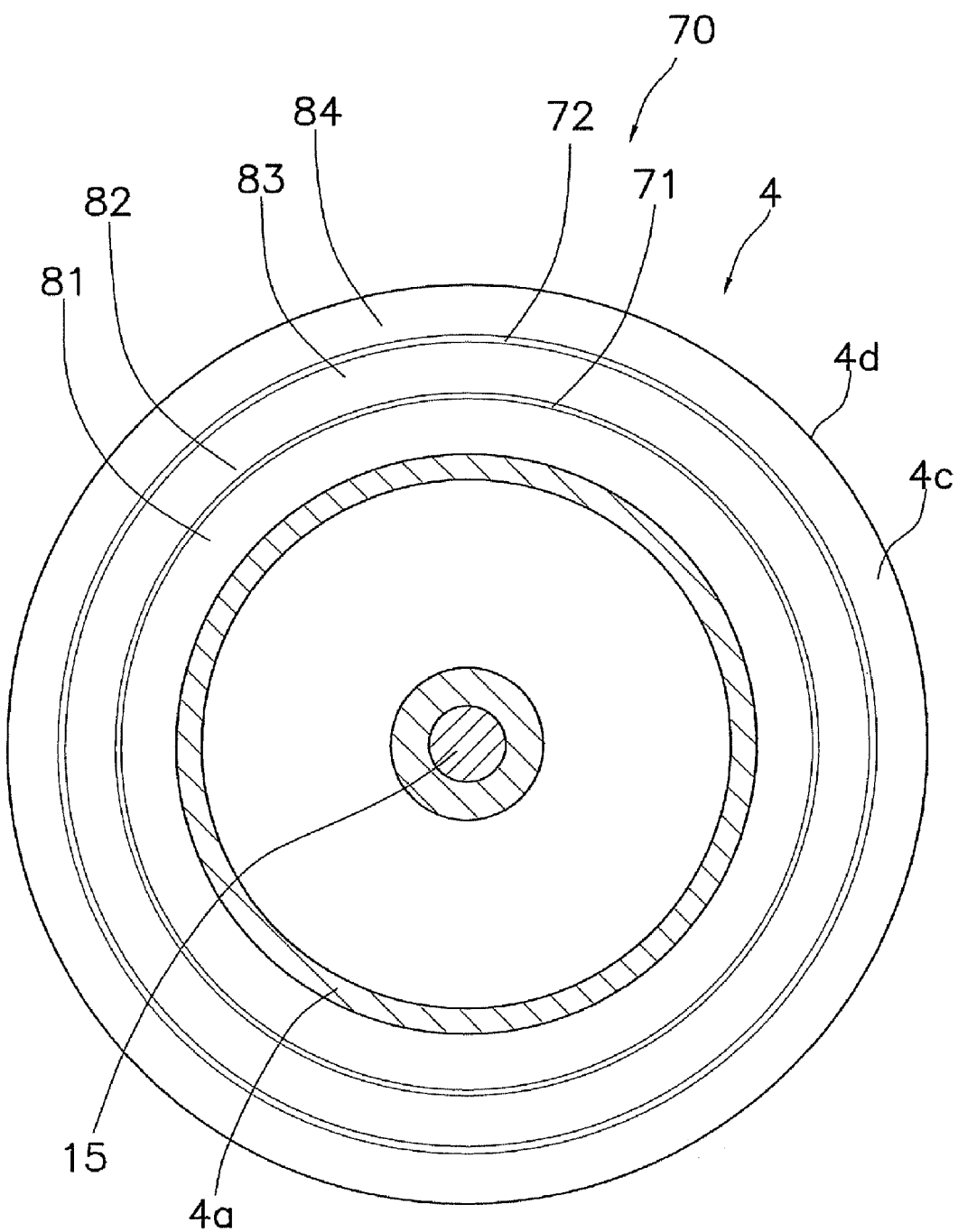
FIG. 4 is an enlarged front side cross-sectional view of the spool.
Figure 5:
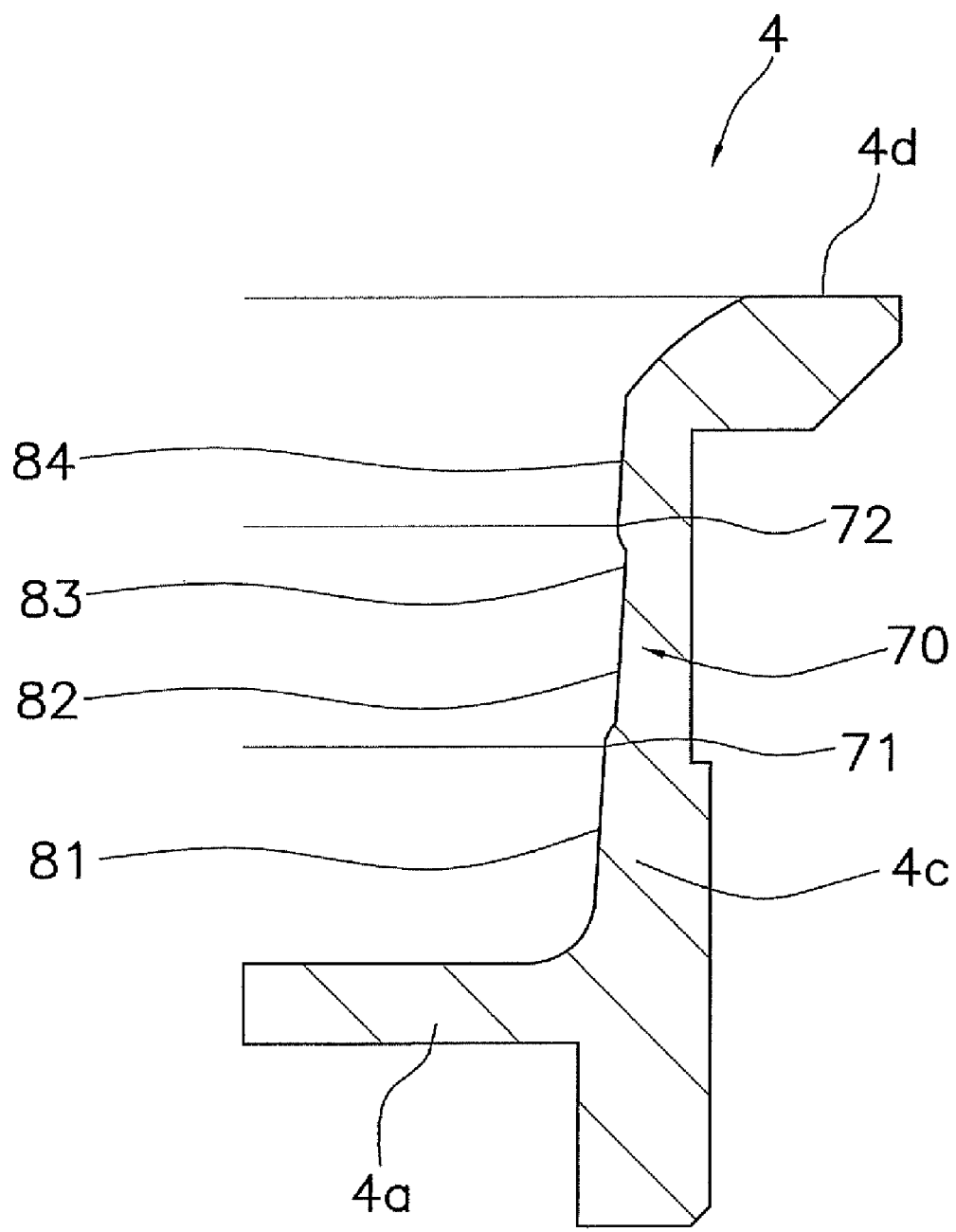
FIG. 5 is an enlarged lateral side cross-sectional view of a rear flange portion of the spool.

As illustrated in the enlarged views of FIGS. 3 to 5, an indicating section 70 is formed on the outer peripheral surface of the rear flange 4c. The indicating section 70 includes a first stepped portion 71 and a second stepped portion 72. Both of the first and second stepped portions 71 and 72 function as indicators for the amount of fishing line wound around the bobbin trunk 4a.

As illustrated in FIGS. 3 and 4, the first stepped portion 71 is an annular step portion. The first stepped portion 71 is formed on a part of the rear flange portion 4c. The first stepped portion 71 is arranged radially outward and proximate to the bobbin trunk 4a. More specifically, the first stepped portion 71 is formed on the small-diameter side of the rear flange portion 4c. For example, when a 50 meter, 0.260 mm dia. fishing line is wound around the spool 4, the wound fishing line will be positioned in the first stepped portion 71. The first stepped portion 71 is formed by a first surface 81 and a second surface 82. The first and second surfaces 81 and 82 are formed on the surface of the rear flange portion 4c. In the radial direction, the first surface 81 is arranged closer to the bobbin trunk 4a than to the second surface 82. In addition, the axial height of the first surface 81 is different from the axial height of the second surface 82. The axial height is the distance along the axial direction with the front surface of the rear flange portion 4c or the rear surface of the front flange portion 4b as the reference point. Specifically, the second surface 82 is a step that has a slightly concave shape, and the axial height of the second surface 82 is lower than that of the first surface 81. The first stepped portion 71 has a tapered shape. The first surface 81, the first stepped portion 71, and the second surface 82 are connected smoothly to each other.

As illustrated in FIG. 5, the second stepped portion 72 is an annular step portion. The second stepped portion 72 is also formed on a part of the rear flange portion 4c. The second stepped portion 72 is arranged radially outward and apart from the bobbin trunk 4a. More specifically, the second stepped portion 72 is formed on the large-diameter side of the rear flange portion 4c. Thus, the second stepped portion 72 is arranged radially outward of the first stepped portion 71. For example, when a 100 meter, 0.260 mm dia. fishing line is wound around the spool 4, the fishing line will be wound up to the second stepped portion 72. The second stepped portion 72 is formed by a third surface 83 and a fourth surface 84. The third surface 83 is formed on the surface of the rear flange portion 4c. The third surface 83 is arranged apart from the bobbin trunk 4a. The fourth surface 84 is arranged radially outward of the third surface 83. In addition, the axial height of the fourth surface 84 is different from that of the third surface 83. Specifically, the fourth surface 84 is a step that has a slightly convex shape, and the axial height of the fourth surface 84 is higher than that of the third surface 83. Also, the second stepped portion 72 is formed in a tapered shape. The third surface 83, the second stepped portion 72, and the fourth surface 84 are connected smoothly to each other.

Also, as illustrated in FIG. 5, the axial heights of the second and third surfaces 82 and 83 are the same, relative to the first and fourth surfaces 81 and 84. As a result, the first stepped portion 71, the second surface 82 (or the third surface 83), and the second stepped portion 72 forms a recess in an axially outward direction (i.e., a direction opposite from a direction that the front and rear flange portions 4b and 4c axially face to each other). In other words, the first stepped portion 71, the second surface 82, the third surface 83, and the second stepped portion 72 are simultaneously formed only by forming the recess. Here, the axial height of the first surface 81 from the second surface 82 are the same as that of the fourth surface 84 from the third surface 83. In other words, the axial height of the first stepped portion 71 from the second surface 82 is the same as that of the second stepped portion 72 from the third surface 83.

Before winding the fishing line around the above-mentioned spool 4, an end of the fishing line is fixed to the bobbin trunk 4a (or the so-called "fishing line fixation"). The fishing line is then wound around the outer periphery of the bobbin trunk 4a.

If the spool 4 is capable of winding the 150 meter, 0.260 mm dia. fishing line around its bobbin trunk 4a and furthermore the first stepped portion 71 or the second stepped portion 72 is used as an indicator for the amount of the wound fishing line, it is possible to easily wind only the 0.260 mm dia. fishing line of a predetermined length (e.g., 50 or 100 meter) around the spool 4.

Furthermore, if it is intended to wind the 0.260 mm dia. fishing line of 50 or 100 meters up to a position of the spool ring 20 of the front flange 4b, the so called "the backing line" is used. In general, the backing line is a cheap fishing line or a used fishing line. In this case, its thickness is greater than that of the 0.260 mm dia. fishing line. For example, when it is intended to wind the 100 meter, 0.260 mm dia. fishing line around the spool 4, the backing line is first wound around the bobbin trunk 4a. Here, the radial height of the wound fishing line corresponds to a theoretical line axially connecting the end of the first stepped portion 71 and the front flange portion 4b (see FIG. 3). Then, the 0.260 mm dia.fishing line is knotted with the tip of the backing line. Thus, when the 100 meter, 0.260 mm dia. fishing line is wound around the spool 4, the wound fishing line reaches to the position of the spool ring 20. Accordingly, it is possible to set the outer peripheral diameter of the wound fishing line to the most preferred level.

Also, when it is intended to only wind the 50 meter, 0.260 mm dia. fishing line around the spool 4, the backing line is wound around the bobbin trunk 4a up to the radial height corresponding to a theoretical line axially connecting the end of the second stepped portion 72 and the front flange portion 4b (see FIG. 3). Then, the 0.260 mm dia. fishing line is knotted with the tip of the backing line. Accordingly, when the 50 meter, 0.260 mm dia. fishing line is wound around the spool 4, the wound fishing line reaches the spool ring 20.

Thus, it is possible to set the outer peripheral diameter of the wound fishing line to the most preferred level.

Furthermore, when it is intended to wind the 150 meter, 0.260 mm dia. fishing line around the spool 4, the fishing line is wound around the bobbin trunk 4a up to the radial height corresponding to a theoretical line axially connecting the outer peripheral surface of the skirt portion 4d and the spool ring 20. Accordingly, it is possible to set the outer peripheral diameter of the fishing line to the most preferred level.

Thus, when the fishing line is wound around the spool 4 with the most preferred outer peripheral diameter, so-called "backlash" is prevented from being easily caused. Note the backlash means a phenomenon that a predetermined amount of fishing line is released forward all together from the spool ring 20 of the front flange portion 4b of the spool 4. In addition, the front flange portion 4b does not block releasing of the fishing line too much, and accordingly it is possible to prolong the flying distance of the tackle.

In the above-mentioned spool 4, the indicating section 70 is formed in the rear flange portion 4c. The first and second stepped portions 71 and 72 function as indicators for the amount of fishing line wound around the bobbin trunk 4a. Here, the first stepped portion 71 is formed by the first and second surfaces 81 and 82. The first surface 81 is a part of the surface of the rear flange portion 4c. The second surface 82 is also a part of the surface of the rear flange portion 4c and is arranged radially outward of the first surface 81. Also, the axial height of the first surface 81 is different from that of the second surface 82. On the other hand, the second stepped portion 72 is formed by the third and fourth surfaces 83 and 84 and is arranged radially outward of the first stepped portion 71. The third surface 83 is a part of the surface of the rear flange portion 4c. The fourth surface 84 is also a part of the surface of the rear flange portion 4c and is arranged radially outward of the third surface 83. Also, the axial height of the third surface 83 is different from that of the fourth surface 84.

As illustrated in FIG. 5, the first stepped portion 71 is an annular step portion. The first stepped portion 71 is formed on a part of the rear flange portion 4c. The first stepped portion 71 is arranged radially outward of and proximate to the bobbin trunk 4a. More specifically, the first stepped portion 71 is formed on the small-diameter side of the rear flange portion 4c. When the 50 meter, 0.260 mm dia. fishing line is wound around the spool 4, the wound fishing line will be positioned in the first stepped portion 71. On the other hand, the second stepped portion 72 is an annular step portion. The second stepped portion 72 is also formed on a part of the rear flange portion 4c. The second stepped portion 72 is arranged radially outward and apart from the bobbin trunk 4a. More specifically, the second stepped portion 72 is formed on the large-diameter side of the rear flange portion 4c. Thus, the second stepped portion 72 is arranged radially outward of the first stepped portion 71. When the 100 meter, 0.260 mm dia. fishing line is wound around the spool 4, the wound fishing line will be positioned in the second stepped portion 72. Here, the indicating section 70 includes the first and second stepped portions 71 and 72, which function as indicators for the amount of fishing line wound around the bobbin trunk 4a. The first and second stepped portions 71 and 72 are arranged in radially different positions. Accordingly, unlike the spool used in conventional practice, it is not necessary to form a plurality of V-shaped grooves in the surface of the spool of the present invention. Therefore, even if the alumite treatment is performed after the first and second stepped portions 71 and 72 are formed, the first and second stepped portions 71 and 72 will be entirely coated with alumite and the like. On the other hand, it is quite difficult to entirely coat the V-shaped grooves formed on the conventional spool with alumite and the like. Accordingly, corrosion resistance of the metal spool 4 will not be easily impaired.

Other Example Embodiments (a) In the above-mentioned embodiment, a spool of a spinning reel is exemplified. However, as illustrated in FIGS. 7 and 8, it is also possible to apply the present invention to a spool of a dual-bearing reel.

Figure 7:
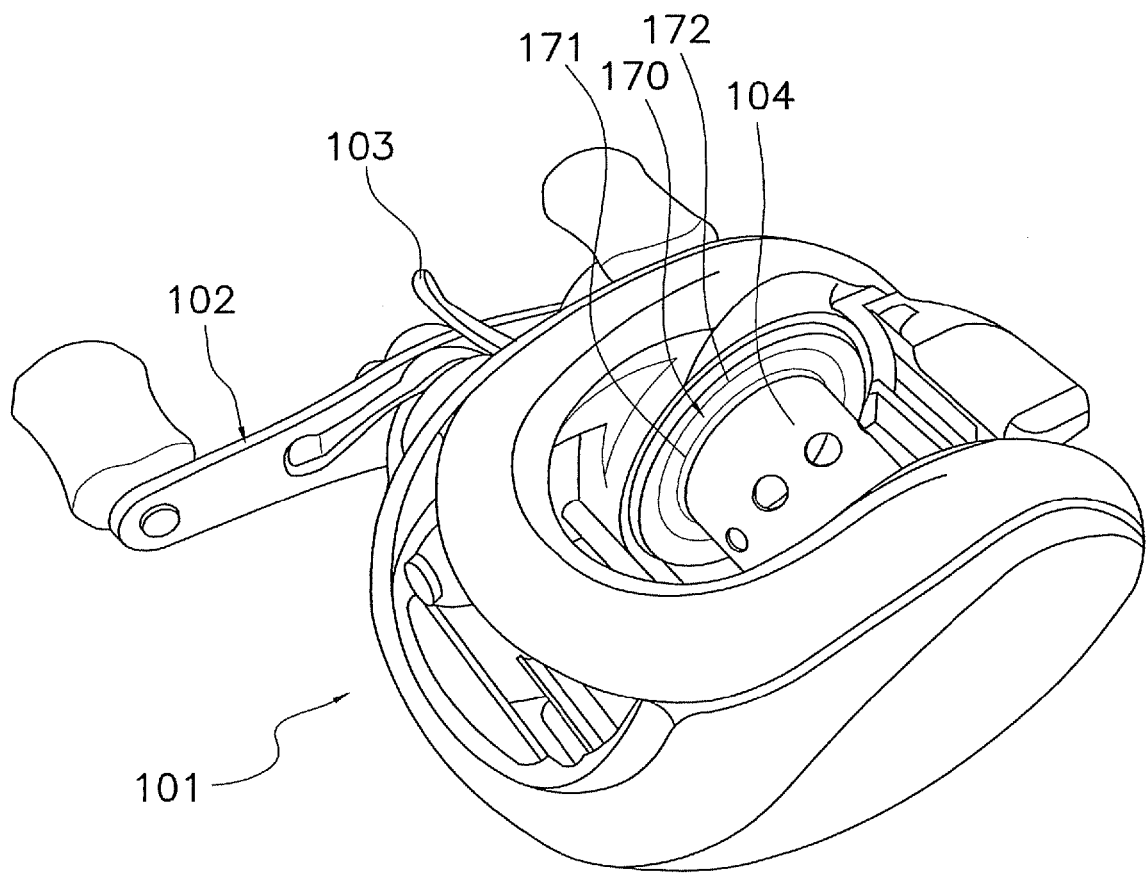
FIG. 7 is a perspective view of a dual-bearing reel that another embodiment is applied.

FIG. 7 illustrates a dual-bearing reel that another embodiment of the present invention is applied. The dual-bearing reel includes a reel unit 101, a handle 102, and a spool 104. The reel unit 101 is made of aluminum alloy. The handle 102 is arranged on the lateral side of the reel unit 101 for rotating the spool 104. The spool 104 is detachably mounted in the interior of the reel unit 101 for winding the fishing line. As such, the spool 104 is capable of rotating. A star drag 103 is mounted on the side of reel unit 101 and proximate to the handle 102 for regulating drag force.

For example, the spool 104 is made of aluminum alloy. Alumite is formed on its surface with the alumite treatment (an example of the anodized treatment). Also, a 120 meter, 0.29 mm dia. fishing line is allowed to be wound around the spool 104. As illustrated in FIG. 8, the spool 104 includes a tubular bobbin trunk 104a, a first flange portion 104b, and a second flange portion 104c. The bobbin trunk 104a, the first flange portion 104b, and a second flange portion 104c are formed as an integral unit. The first and second flange portions 104b and 104c are formed in a saucer shape and arranged on the both ends of the bobbin trunk 104a.

Figure 8:
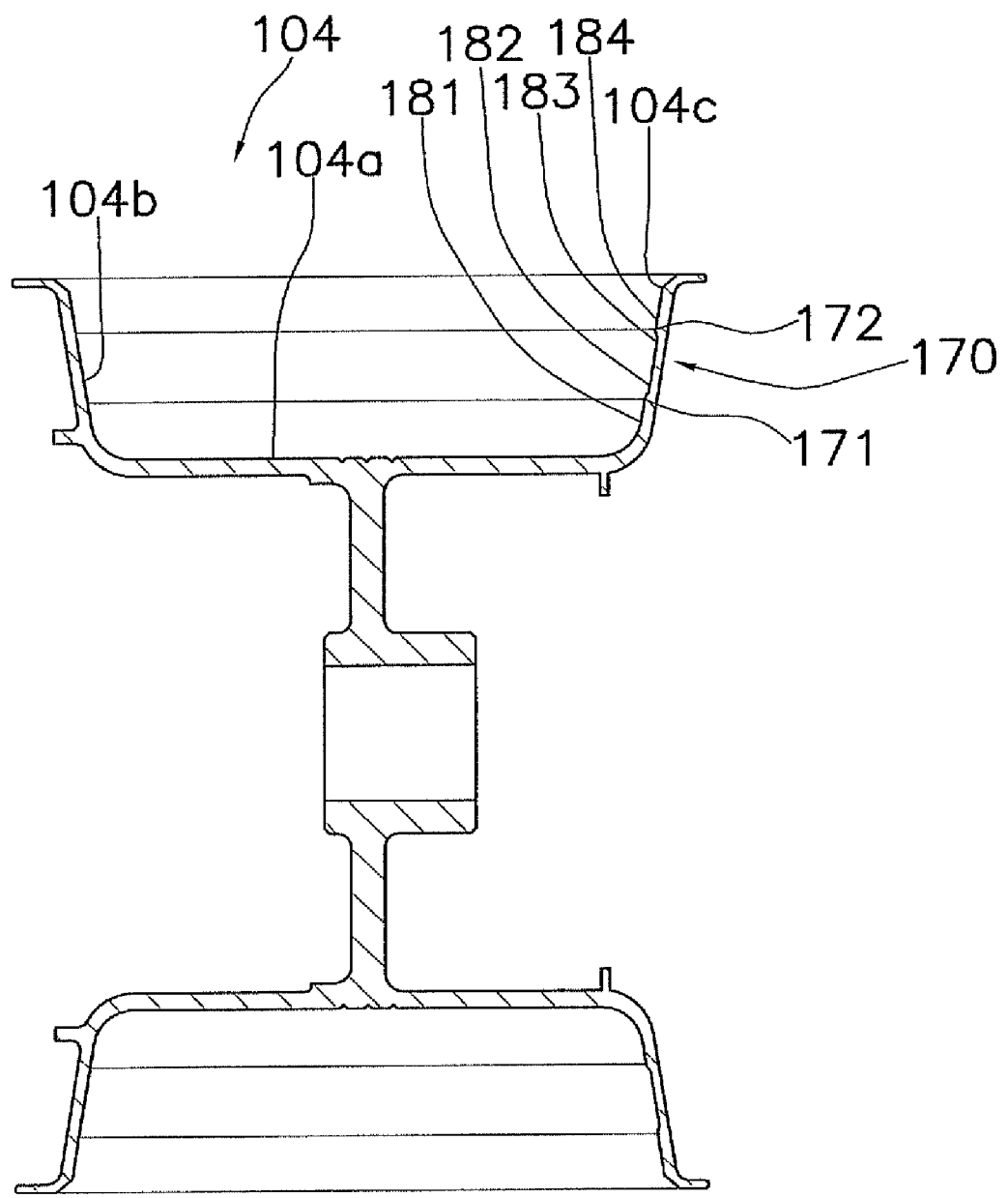
FIG. 8 is an enlarged lateral side cross-sectional view of a spool of the dual-bearing reel in accordance with another embodiment.

As illustrated in FIG. 8, an indicating section 170 is formed on the outer peripheral surface of the second flange portion 104c. The indicating section 170 includes a first stepped portion 171 and a second stepped portion 172. The first and second stepped portions 171 and 172 function as indicators for the amount of wound fishing line.

As illustrated in FIG. 8, the first stepped portion 171 is an annular stepped portion. The first stepped portion 171 is formed on a part of the second flange portion 104c. The first stepped portion 171 is arranged and radially outward and proximate to the bobbin trunk 104a. More specifically, the first stepped portion 171 is formed on the small-diameter side of the second flange portion 104c. For example, when a 40 meter, 0.29 mm dia. fishing line is wound around the spool 104, the wound fishing line will be positioned in the first stepped portion 171. The first stepped portion 171 is formed by a first surface 181 and a second surface 182. The first surface 181 is a part of the surface of the second flange portion 104c and is arranged adjacent to the bobbin trunk 104a. The second surface 182 is also a part of the second flange portion 104c and is arranged radially outward of the first surface 181. Also, the axial height of the first surface 181 is different from that of the second surface 182. The second surface 182 is a step, which is slightly recessed relative to the first surface 181, and the axial height of the second surface 182 is lower than the axial height of the first surface 181. Also, the first stepped portion 171 is tapered. The first surface 181, the first stepped portion 171, and the second surface 182 are connected smoothly to each other.

As illustrated in FIG. 8, the second stepped portion 172 is an annular stepped portion. The second stepped portion 172 is formed on a part of the second flange portion 104c. The second stepped portion 172 is arranged radially outward and apart from the bobbin trunk 104a. More specifically the second stepped portion 102 is formed on the large-diameter side of the second flange portion 104c. Thus, the second stepped portion 172 is arranged radially outward of the first stepped portion 171. For example, when a 80 meter, 0.29 mm dia. fishing line is wound around the spool 104, the wound fishing line will be positioned in the second stepped portion 172. The second stepped portion 172 is formed by a third surface 183 and a fourth surface 184. The third surface 183 is a part of the surface of the second flange portion 104c and is arranged away from the bobbin trunk 104a. The fourth surface 184 is formed radially outward of the third surface 183. The axial height of the third surface 183 is different from that of the fourth surface 184. The fourth surface 184 is a protruded step, and the axial height of the fourth surface 184 is higher than that of the third surface 183. Also, the second stepped portion 172 is tapered. The third surface 183, the second stepped portion 172, and the fourth surface 184 are connected smoothly to each other.

As illustrated in FIG. 8, the second and third surfaces 182 and 183 are connected smoothly to each other and their axial heights are the same. Accordingly, the first stepped portion 171, the second surface 182 (or the third surface 183), and the second stepped portion 172 form a recess in an axially outward direction (i.e., a direction opposite from a direction that the first and second flange portions 104b and 104c face to each other). In other words, the first stepped portion 171, the second and third surfaces 182 and 183, and the second stepped portion 172 are simultaneously formed only by forming the recess. Here, the axial height of the first surface 181 from the second surface 182 and that of the fourth surface 184 from the third surface 183 are the same. In other words, the axial height of the first stepped portion 171 from the second surface 182 and that of the second stepped portion 172 from the third surface 183 are the same.

The second flange portion 104c of the spool 104 includes the indicating section 170. The indicating section 170 includes the first and second stepped portions 171 and 172 functioning as the indicators for the amount of the wound fishing line. The first stepped portion 171 is formed by the first and second surfaces 181 and 182. The first surface 181 is a part of the surface of the second flange portion 104c, and the second surface 182 is formed radially outward of the first surface 181. The axial height of the first surface 181 is different from that of the second surface 182.

On the other hand, the second stepped portion 172 is formed by the third surface 183 and the fourth surface 184 and is arranged radially outward of the first stepped portion 171. The third surface 183 is a part of the surface of the second flange portion 104c, and the fourth surface 184 is formed radially outward of the third surface 183. The axial height of the third surface 183 is different from that of the fourth surface 184. Also, the first stepped portion 171 is annular stepped portion. The first stepped portion 171 is formed on a part of the second flange portion 104c. The first stepped portion 171 is arranged radially outward and proximate to the bobbin trunk 104a. Specifically, the first stepped portion 171 is formed on the small-diameter side of the second flange portion 104c. When the 40 meter, 0.29 mm dia. fishing line is wound around the spool 104, the wound fishing line will be positioned in the first stepped portion 171.

On the other hand, the second stepped portion 172 is an annular stepped portion. The second stepped portion 172 is formed on a part of the second flange portion 104c. The second stepped portion 172 is arranged radially outside and away from the bobbin trunk 104a. Specifically, the second stepped portion 172 is formed on the large-diameter side of the second flange portion 104c and is arranged radially outside the first stepped portion 171. When the 80 meter, 0.29 mm dia. fishing line is wound around the spool 104, the wound fishing line will be positioned in the second stepped portion 172. Here, the indicating section 170 includes the first and second stepped portions 171 and 172, which operate as indicators for the amount of fishing line wound. The first and second stepped portions 171 and 172 are arranged in radially different positions.

Therefore, while V-shaped grooves have been formed in conventional spools, it is not necessary to form a plurality of V-shaped grooves in the spool of the present embodiment. With the structure, even if the alumite treatment is performed after the first and second stepped portions 171 and 172 are formed, the first and second stepped portions 171 and 172 will be entirely coated with alumite. Thus, corrosion resistance of the metal spool 104 will not be easily impaired.

Figure 6:
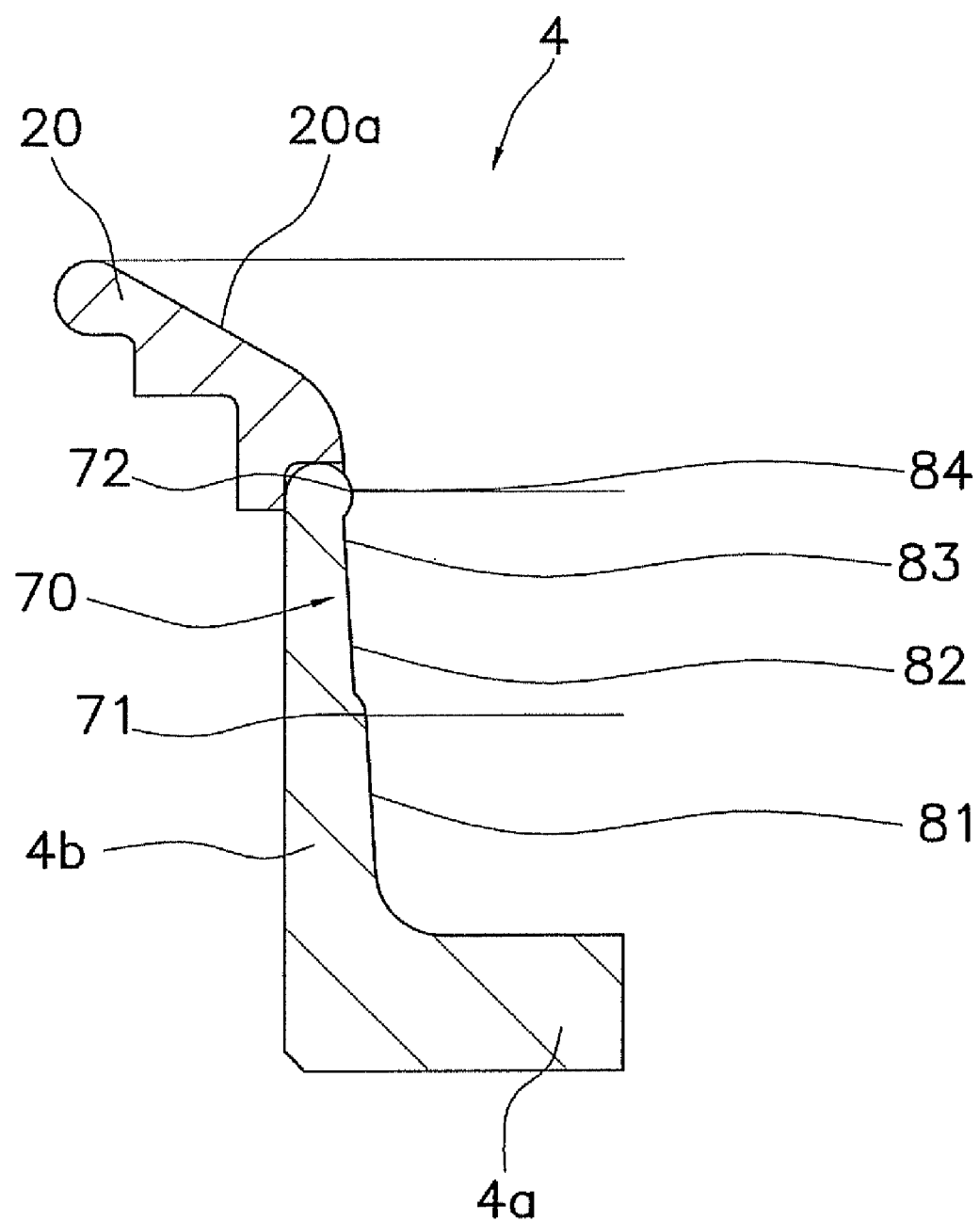
FIG. 6 is an enlarged lateral side cross-sectional view of a front flange portion of a spool in accordance with another embodiment.
Figure 12:
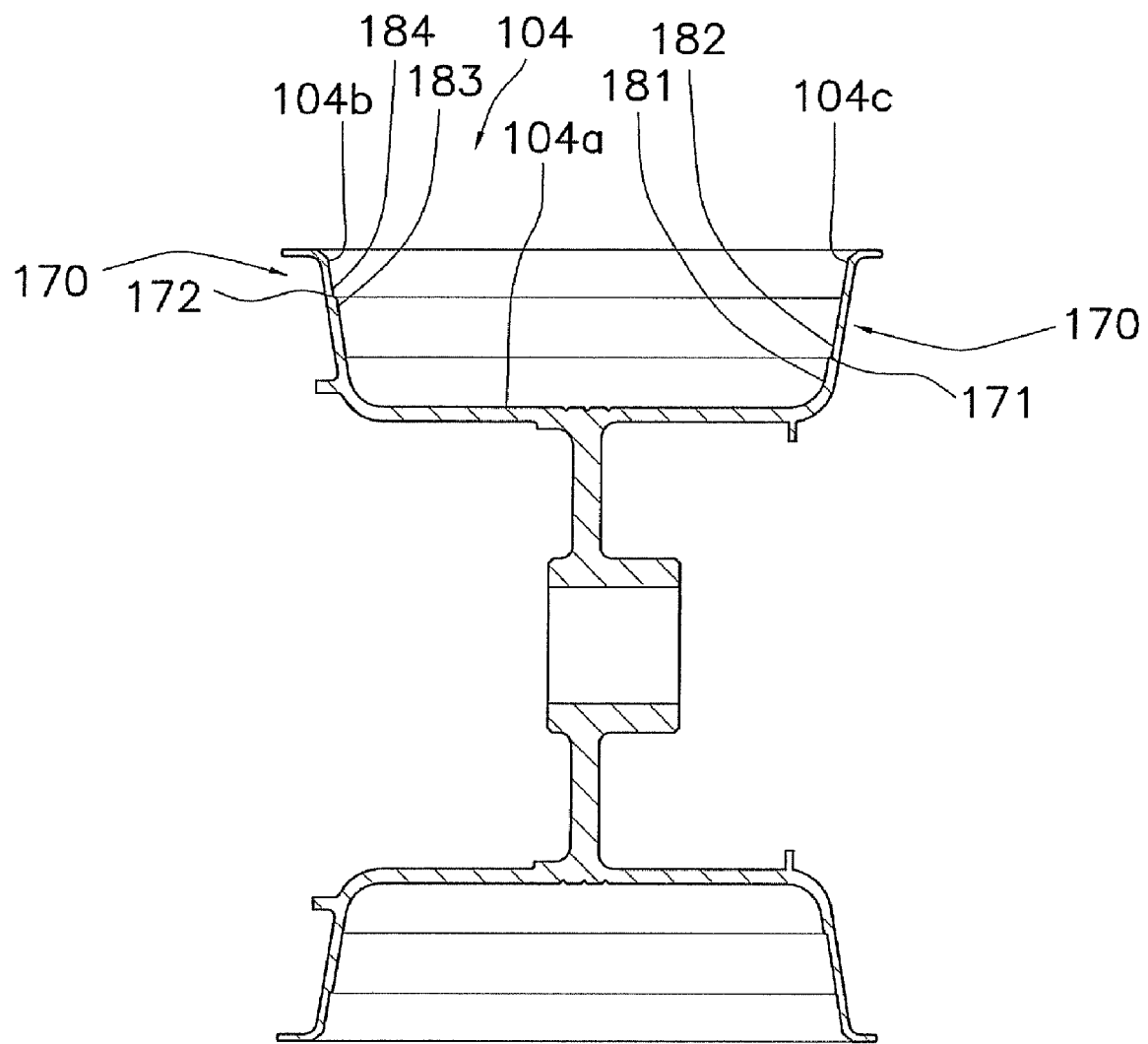
FIG. 12 is an enlarged lateral side cross-sectional view of a spool of the dual-bearing reel in accordance with another embodiment, and corresponds to FIG. 8.

(b) In the above-mentioned embodiment, the first and second stepped portions 71 and 72 are formed in the rear flange portion 4c. However, as illustrated in FIG. 6, the first and second stepped portions 71 and 72 may be formed in the front flange portion 4b. Also, the first and second stepped portions 71 and 72 may be formed in both of the front and rear flange portions 4b and 4c (this is not illustrated in the figure). Also, in the above-mentioned example embodiment (a), the first and second stepped portions 171 and 172 are formed in the second flange portion 104c. However, as illustrated in FIG. 12, the first stepped portion 171 may be formed in the second flange portion 104c, and the second stepped portion 172 may be formed in the first flange portion 104b.

Figure 9:
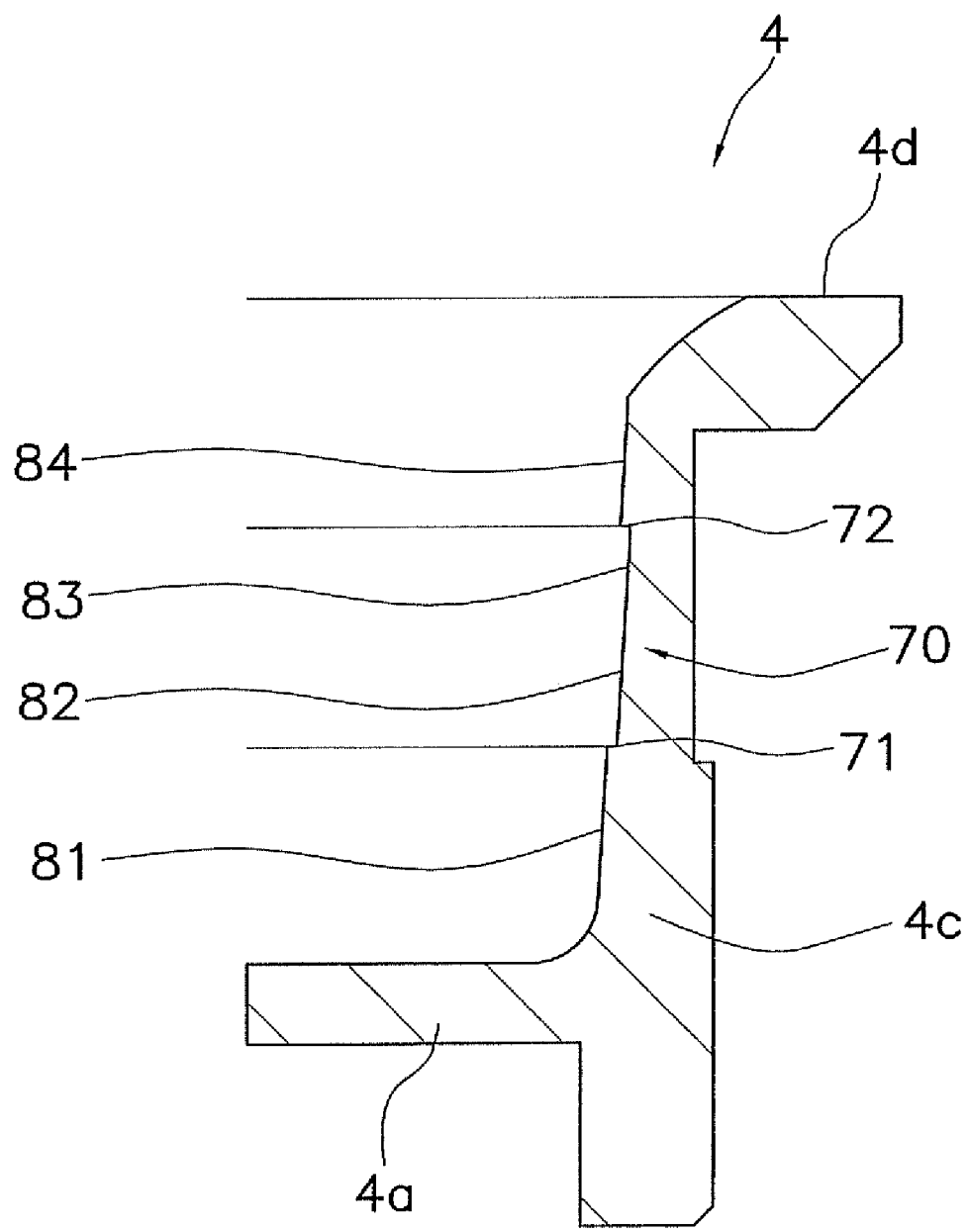
FIG. 9 is an enlarged lateral side cross-sectional view of a rear flange portion of the spool in accordance with another embodiment, and corresponds to FIG. 5.

(c) In the above-mentioned embodiment, the first and second stepped portions 71 and 72 are tapered. However, as illustrated in FIG. 9, the first and second stepped portions 71 and 72 may be substantially right-angled stepped portions without any tapered portions.

Figure 10:
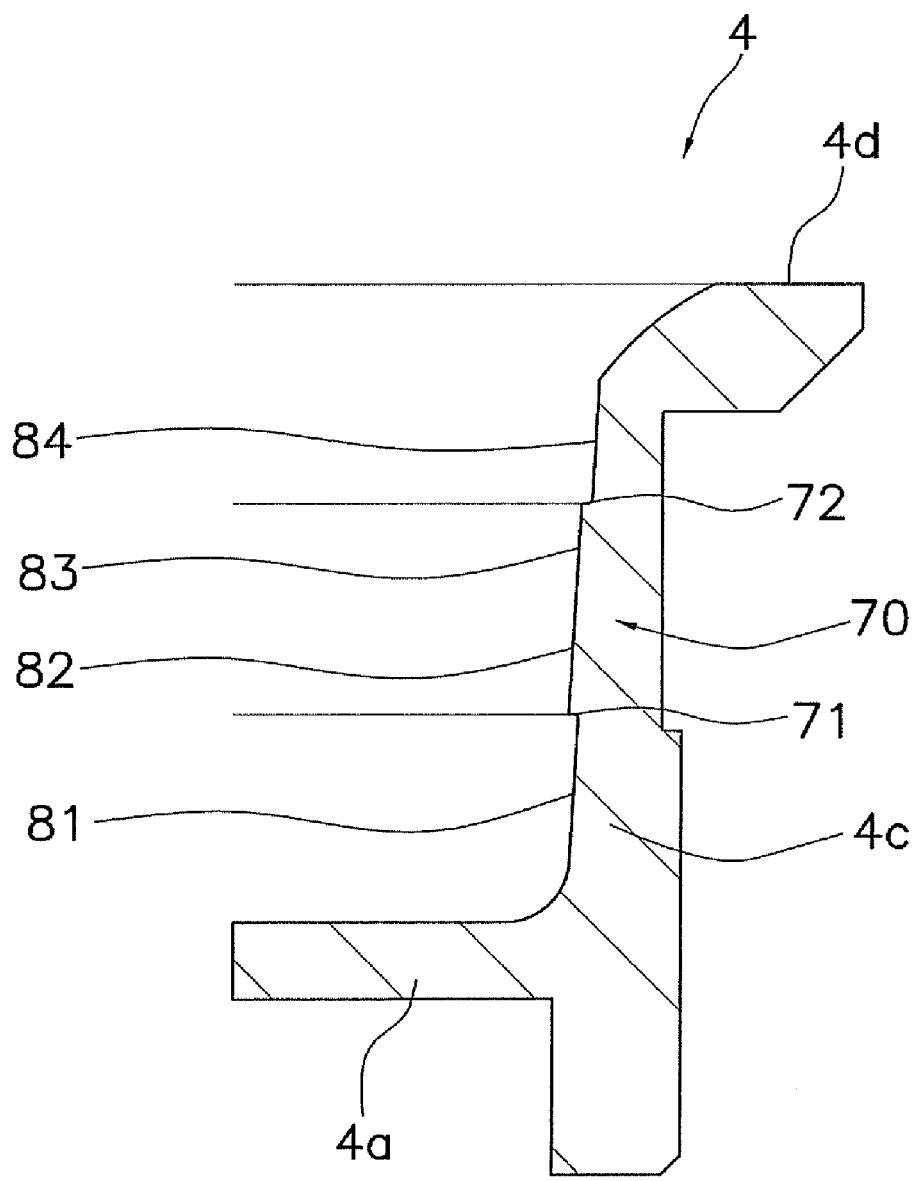
FIG. 10 is an enlarged lateral side cross-sectional view of a rear flange portion of the spool in accordance with another embodiment, and corresponds to FIG. 5.
Figure 11:
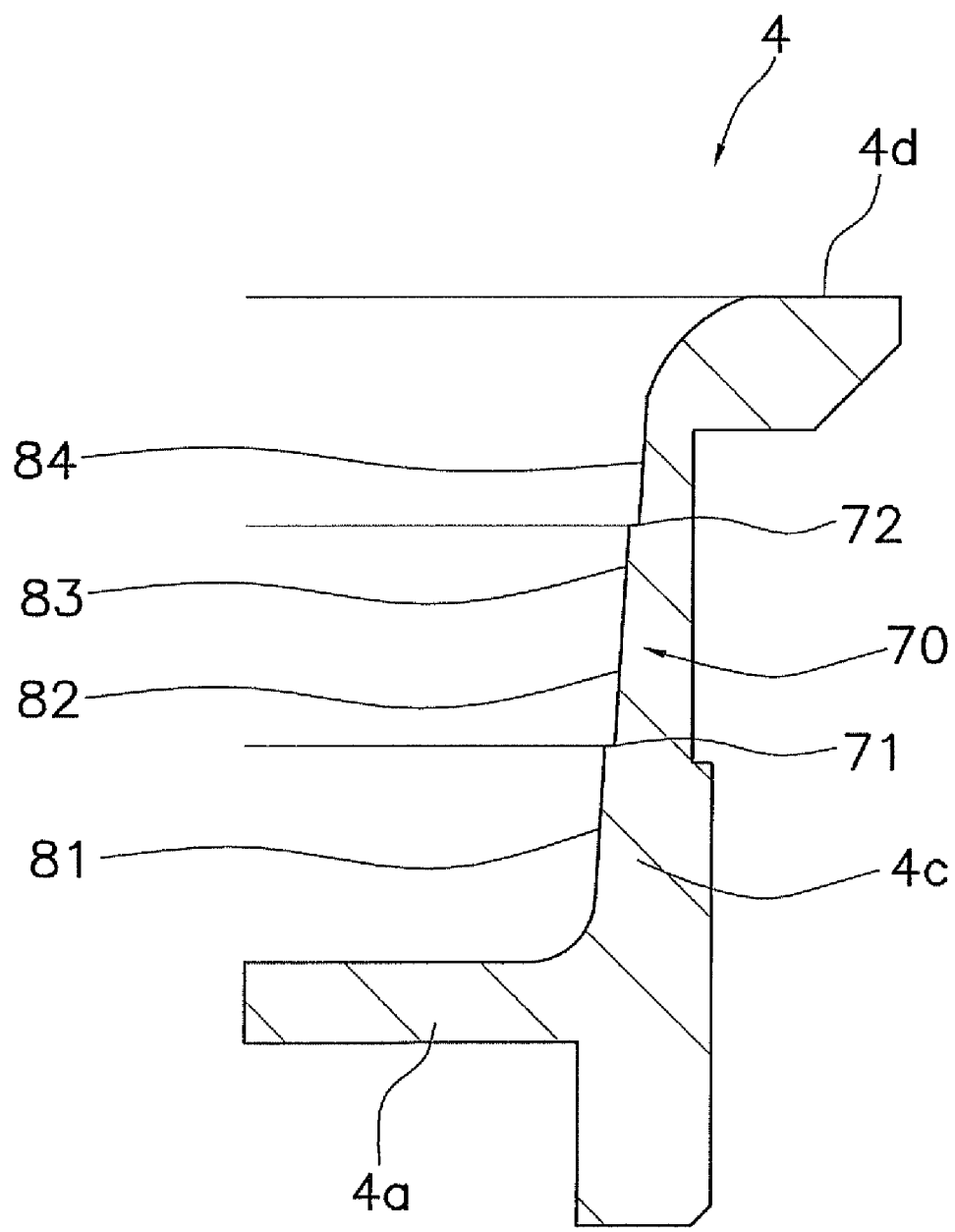
FIG. 11 is an enlarged lateral side cross-sectional view of a rear flange portion of the spool in accordance with another embodiment, and corresponds to FIG. 5.

(d) In the above-mentioned embodiment, the second surface 82 is a recessed step, and the axial height of the second surface 82 is lower than that of the first surface 81. Also, the fourth surface 84 is a protruded step, and the axial height of the fourth surface 84 is higher than that of the third surface 83. However, as illustrated in FIG. 10, the second and third surfaces 82 and 83 may be protruded steps, and the axial height of the second surface 82 may be higher than that of the first surface 81. Also, the fourth surface 84 may be a recessed step, and the axial height of the fourth surface 84 may be lower than that of the third surface 83. In an example of FIG. 10, the second and third surfaces 82 and 83 are connected smoothly to each other, and their axial heights are the same. Accordingly, the first stepped portion 71, the second surface 82 (or the third surface 83), and the second stepped portion 72 form a convex portion protruding in a radially inward direction (i.e., a direction that the front and rear flange portions 4b and 4c face to each other). Also, as illustrated in FIG. 11, the second surface 82 may be a dented step, and the axial height of the second surface 82 may be lower than that of the first surface 81. In addition, the fourth surface 84 may be a recessed step, and the axial height of the fourth surface 84 may be lower than that of the third surface 83. Thus, the first and second stepped portions 71 and 72 may be stepped radially outward.

General Interpretation

As used herein, the following directional terms, for example, "forward, rearward, above, downward, outward, inward, outside, inside, vertical, horizontal, below and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "slightly", "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool of a fishing reel for winding and releasing a fishing line, comprising:
    a tubular bobbin trunk for winding the fishing line on the outer peripheral surface thereof;
    a first metal flange portion and a second metal flange portion opposite to the first flange portion, the first and second flange portions extending radially outward from both ends of the bobbin trunk; and
    an indicating section including
        a first stepped portion formed on at least one of the opposed surfaces of the first and second flange portions, the first stepped portions having first and second surfaces, the second surface being positioned radially outward of the first surface, the first and second surfaces of the first stepped portion having different axial heights, and
        a second stepped portion having third and fourth surfaces and positioned radially outward of the first stepped portion, the third surface being formed on at least one of the opposed surfaces of the first and second flange portions, the fourth surface being positioned radially outside of the third surface, the third and fourth surfaces having different axial heights,
    the first and second stepped portions being exposed on an outside of the bobbin trunk.

2. The spool of a fishing reel according to claim 1, wherein the first, second, third, and fourth surfaces are formed on either of the first and second flange portions.

3. The spool of a fishing reel according to claim 1, wherein the second and third surfaces are smoothly connected to each other and have the same axial height.

4. The spool of a fishing reel according to claim 1, wherein the second surface is a recessed surface and the axial height of the second surface is lower than that of the first surface, or the fourth surface is a recessed surface and the axial height of the fourth surface is lower than that of the third surface.

5. The spool of a fishing reel according to claim 1, wherein the second surface is protruded and the axial height of the second surface is higher than that of the first surface, or the fourth surface is protruded and the axial height of the fourth surface is higher than that of the third surface.

6. The spool of a fishing reel according to claim 1, wherein at least one of the first and second stepped portions is tapered.

7. The spool of a fishing reel according to claim 1, wherein the first surface, the first stepped portion, and the second surface are connected smoothly to each other, or the third surface, the second stepped portion, and the fourth surface are connected smoothly to each other.

8. The spool of a fishing reel according to claim 1, wherein the bobbin trunk, the first flange portion, and the second flange portion are made of metal and are formed as an integral unit.

9. The spool of a fishing reel according to claim 8, further comprising an anodized layer is formed on the metal surfaces of the first and second flange portions by an anodized treatment.

10. The spool of a fishing reel according to claim 1, wherein
the fishing reel is a spinning reel configured to release the fishing line forward, and the spool is movably mounted along the longitudinal axis of a reel unit.

11. The spool of a fishing reel according to claim 10, wherein
the first flange portion corresponds to a front flange portion protruding radially outward from the front end of the bobbin trunk, and the second flange portion corresponds to a rear flange portion protruding radially outward from the rear end of the bobbin trunk.

12. The spool of a fishing reel according to claim 1, wherein
the fishing reel is a dual-bearing reel for winding and releasing the fishing line, and the spool is rotatably mounted to a reel unit.

13. The spool of a fishing reel according to claim 12, wherein
the first and second flange portions are disk flange portions protruding radially outward from both ends of the bobbin trunk.

14. A spool of a fishing reel for winding and releasing a fishing line, comprising:
a tubular bobbin trunk for winding the fishing line on the outer peripheral surface thereof;
a first metal flange portion and a second metal flange portion opposite to the first flange portion, the first and second flange portions extending radially outward from both ends of the bobbin trunk; and
an indicating section including
a first stepped portion formed on at least one of the opposed surfaces of the first and second flange portions, the first stepped portions having first and second surfaces, the second surface being positioned radially outward of the first surface, the first and second surfaces of the first stepped portion having different axial heights, and
a second stepped portion having third and fourth surfaces and positioned radially outward of the first stepped portion, the third surface being formed on at least one of the opposed surfaces of the first and second flange portions, the fourth surface being positioned radially outside of the third surface, the third and fourth surfaces having different axial heights,
the second surface protruding and the axial height of the second surface being higher than that of the first surface, or the fourth surface protruding and the axial height of the fourth surface being higher than that of the third surface.

* * * * *